(12) United States Patent
Desai et al.

(10) Patent No.: US 10,599,366 B2
(45) Date of Patent: Mar. 24, 2020

(54) METHOD AND SYSTEM FOR THICK FILES IN A DISTRIBUTED FILE SYSTEM

(71) Applicant: VMWARE, INC., Palo Alto, CA (US)

(72) Inventors: Asit Desai, Palo Alto, CA (US); Prasanna Aithal, Bangalore (IN); Prasad Rao Jangam, Palo Alto, CA (US); Bryan Branstetter, Palo Alto, CA (US); Mahesh S Hiregoudar, Bangalore (IN); Pradeep Krishnamurthy, Bangalore (IN); Rohan Pasalkar, Palo Alto, CA (US); Raghavan Pichai, Bangalore (IN); Srinivasa Shantharam, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 308 days.

(21) Appl. No.: 15/598,345

(22) Filed: May 18, 2017

(65) Prior Publication Data
US 2018/0239779 A1    Aug. 23, 2018

(30) Foreign Application Priority Data

Feb. 23, 2017  (IN) .............................. 201741006560

(51) Int. Cl.
  *G06F 3/06* (2006.01)
(52) U.S. Cl.
  CPC ............ G06F 3/067 (2013.01); G06F 3/0611 (2013.01); G06F 3/0643 (2013.01); *G06F 3/0608* (2013.01)

(58) Field of Classification Search
CPC ........ G06F 3/0631; G06F 3/067; G06F 3/064; G06F 3/0643
See application file for complete search history.

(56) References Cited

U.S. PATENT DOCUMENTS

| | | | | |
|---|---|---|---|---|
| 5,454,103 A | * | 9/1995 | Coverston | G06F 3/0601 |
| 8,898,402 B1 | * | 11/2014 | Stronge | G06F 3/0605 711/100 |
| 8,935,493 B1 | * | 1/2015 | Dolan | G06F 3/0649 711/117 |
| 9,841,901 B1 | * | 12/2017 | Armangau | G06F 16/1727 |
| 10,048,885 B1 | * | 8/2018 | Bono | G06F 3/0643 |
| 2013/0111182 A1 | * | 5/2013 | Aslot | G06F 3/0608 711/203 |
| 2014/0089921 A1 | * | 3/2014 | Yang | G06F 9/45558 718/1 |
| 2015/0134928 A1 | * | 5/2015 | Goodman | G06F 3/0655 711/170 |
| 2017/0024160 A1 | * | 1/2017 | Feldman | G06F 3/064 |
| 2017/0242610 A1 | * | 8/2017 | Atia | G06F 3/0644 |
| 2017/0269862 A1 | * | 9/2017 | Agombar | G06F 3/0631 |

* cited by examiner

*Primary Examiner* — Jesse P Frumkin

(57) ABSTRACT

A distributed file system may be configured with file blocks of a first type and file blocks of a second type, from allocation units that comprise a logical volume containing the file system. File blocks of the second type may be defined from one or more file blocks of the first type. A thick file may be instantiated with a number of allocation units totaling a size greater than or equal to a specified file size of the thick file. The allocation units may be allocated to the thick file in units of file blocks of the first type or file blocks of the second type, depending on the specified file size of the thick file.

18 Claims, 13 Drawing Sheets

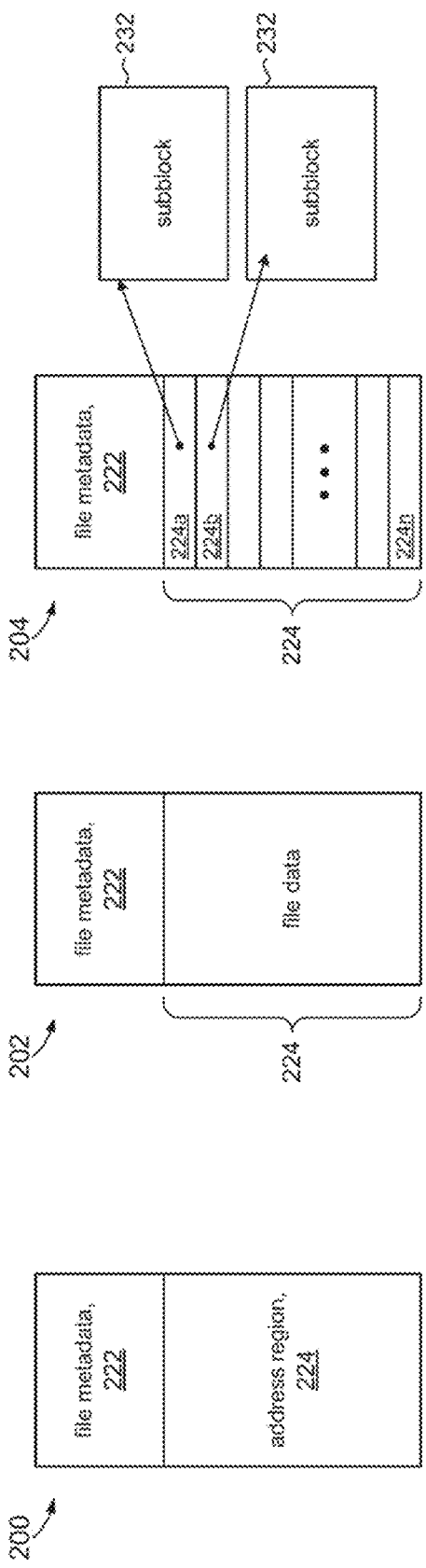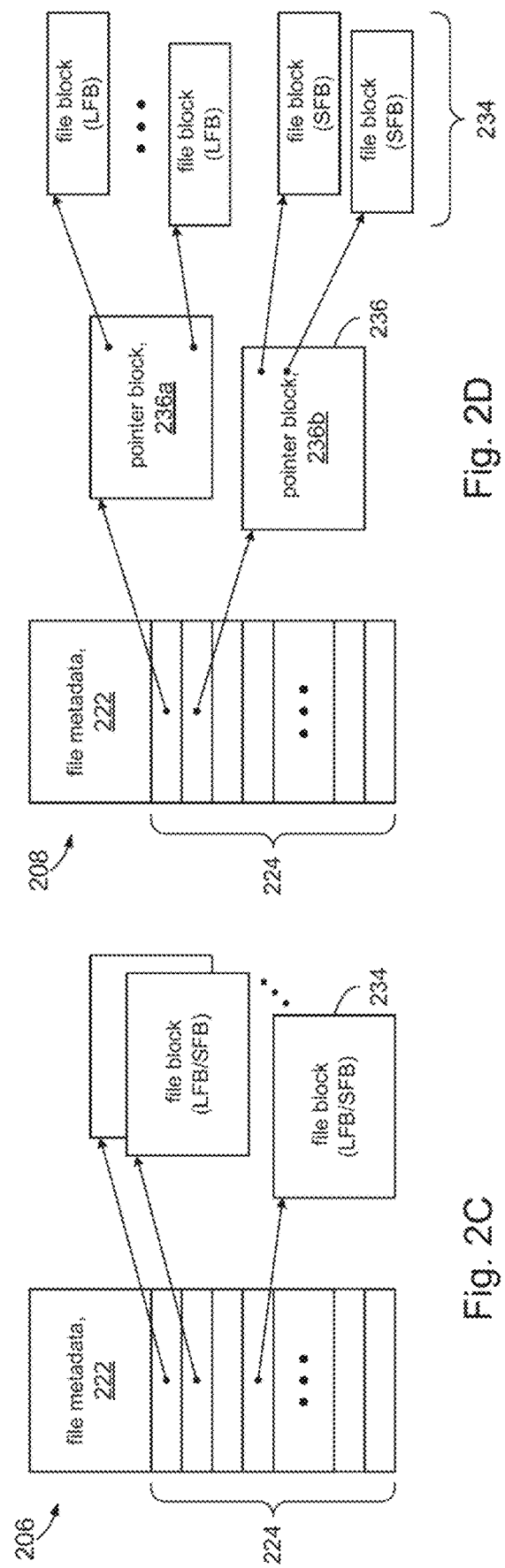

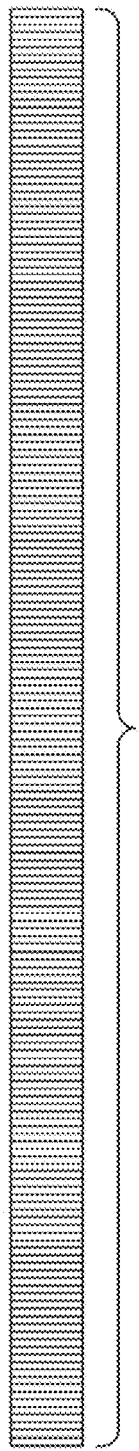

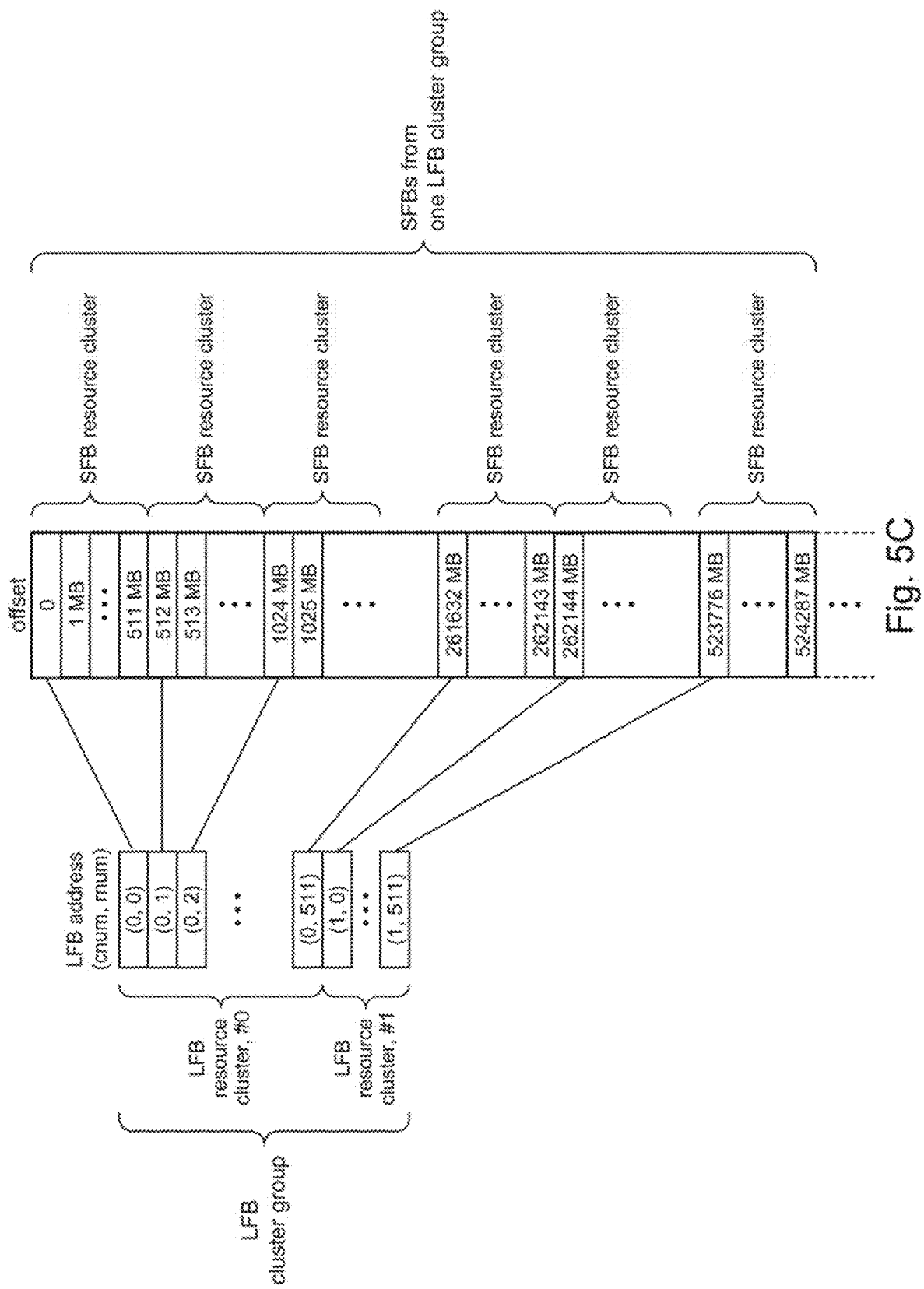

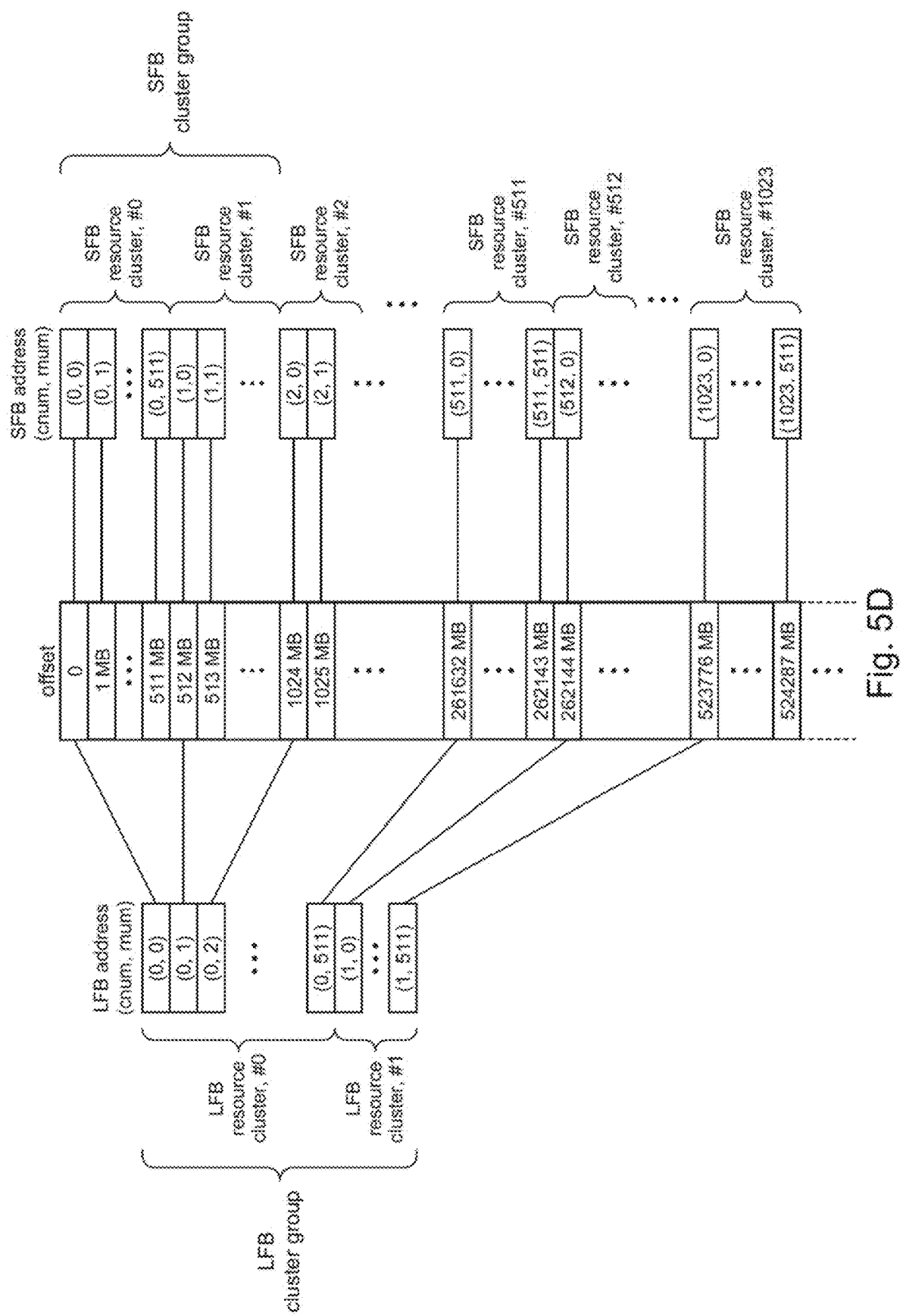

METHOD AND SYSTEM FOR THICK FILES IN A DISTRIBUTED FILE SYSTEM

RELATED APPLICATIONS

Benefit is claimed under 35 U.S.C. 119(a)-(d) to Foreign Application Serial No. 201741006560 filed in India entitled "METHOD AND SYSTEM FOR THICK FILES IN A DISTRIBUTED FILE SYSTEM", on Feb. 23, 2017, by VMware, Inc., which is herein incorporated in its entirety by reference for all purposes.

BACKGROUND

In a virtualized environment, a distributed file system may be employed to host virtual machine data. The distributed file system may manage different types of resources including the allocation and deallocation of storage (file blocks) for files. When files are created or grown, file system storage is consumed (allocated), and when files are truncated or removed, file system storage is freed (deallocated). It is therefore important that host machines in the virtualized environment with access to the file system have a consistent view of the current state of the file system. In order to ensure that only one host machine at a time is consuming or freeing a particular set of resources (e.g., file blocks), a locking mechanism may be employed to ensure mutual exclusion of file system resources.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 illustrates an example of a file descriptor.

FIGS. 2A-2D illustrate different addressing modes.

FIGS. 3A-3E illustrate a configuration of a logical volume in accordance with the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
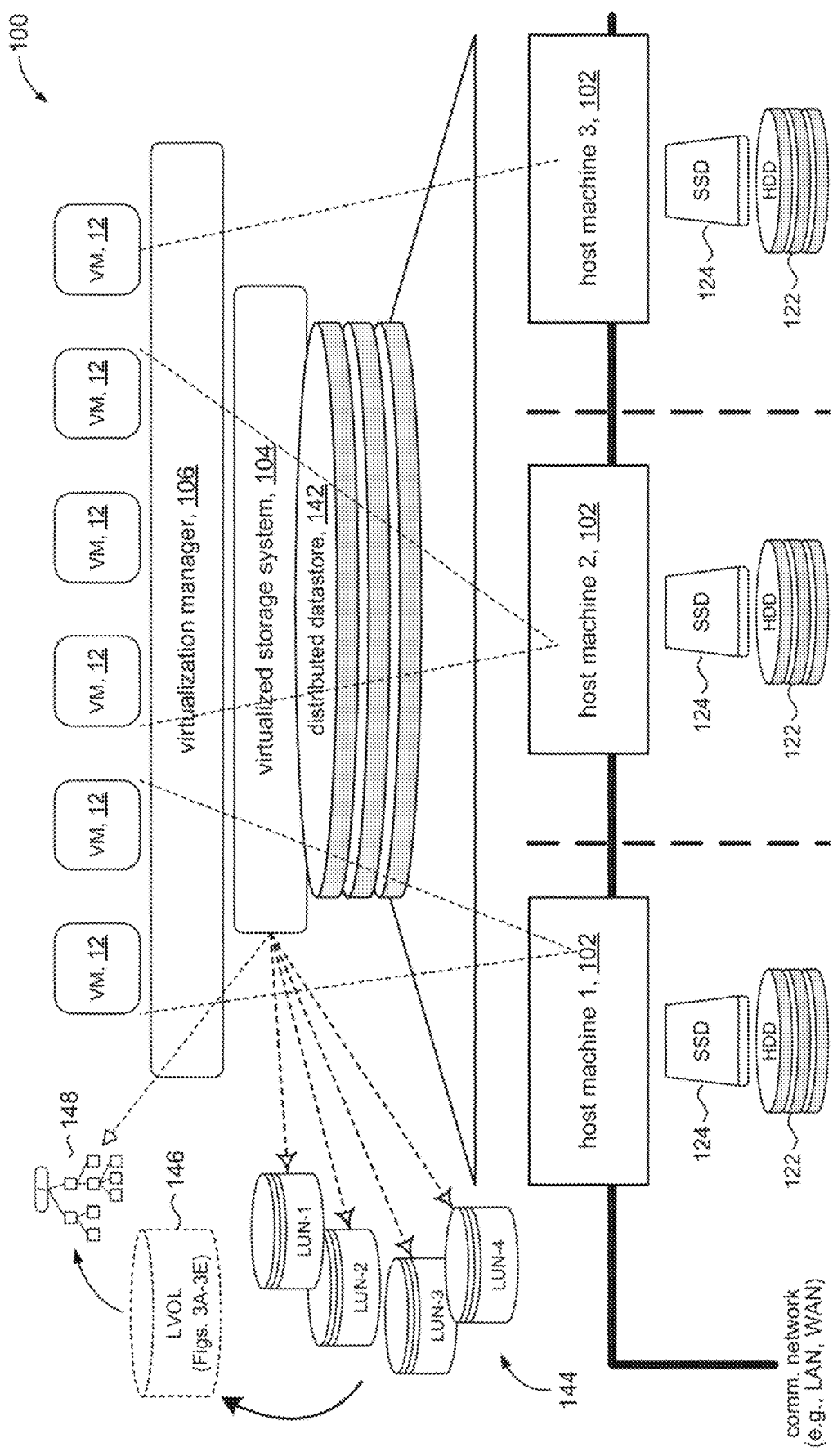
FIG. 1 illustrates a computing system that may include a distributed file system in accordance with the present disclosure.

FIG. 1 illustrates an example of a distributed file system in a accordance with the present disclosure in a virtual environment 100. The virtual environment 100 may support the definition and configuration of virtual machines (VMs) 12, and the deployment of VMs 12. The underlying hardware that comprises the virtual environment 100 may include host machines 102 and a communication network (e.g., LAN, WAN) to interconnect the host machines 102. Although FIG. 1 illustrates three host machines 102, it will be appreciated that the virtual environment 100 may comprise additional (or fewer) host machines 102. The VMs 12 may be deployed among the host machines 102, as depicted for example in FIG. 1.

Each host machine 102 (e.g., host machine 1) may include one or more hard disk drives (HDDs) 122 connected to the host machine 102. In some embodiments, the hard disk drives 122 may be configured according to the SCSI (Small Computer System Interface) protocol, and each host 102 may communicate with its local hard disk drives 122 using the SCSI protocol. Each host machine 102 may include a solid state drive or disk (SSD) 124; e.g., for read and write caching. Each host machine 102 may be configured with a hypervisor (not shown), also referred to as a virtual machine monitor (VMM), to support the execution of VMs 12 on that host machine 102.

The virtual environment 100 may include a virtualized storage system 104 that provides a virtual shared distributed datastore 142. The distributed datastore 142 may comprise an aggregation of hard disk drives 122 and solid state drives 124 respectively connected to the host machines 102. In some embodiments, the hard disk drives 122 may be used to provide persistent storage in the shared distributed datastore 142, while the solid state drives 124 may serve as read and write caches for data I/O operations. It will be appreciated, that in other embodiments, the shared distributed datastore 142 may be based on any suitable shared storage architecture such as NAS (network attached storage), fibre channel SAN (storage area network) disk farm, iSCSI SAN disk farm, etc.

The virtual environment 100 may include a virtualization manager 106 to provide various management services to support operations in the virtual environment 100. For example, the virtualization manager 106 may define virtual machines 12, and deploy the virtual machines 12 among the (physical) host machines 102. The virtualization manager 106 may define one or more shared LUNs (distributed storage devices) 144 allocated from the pool of storage comprising the distributed datastore 142. In some embodiments, for example, a shared LUN 144 may comprise one or more hard disk drives 122 from among several host machines 102.

One or more logical volumes 146 configured in accordance with the present disclosure may be defined on a LUN 144. In some embodiments, a single logical volume 146 may span several LUNs 144. A distributed file system 148 configured in accordance with the present disclosure may be defined on a logical volume 146. These aspects of the present disclosure are discussed in more detail below.

It will be understood by those of ordinary skill, that embodiments in accordance with the present disclosure may be practiced in any suitable distributed virtual environment. It will be appreciated that embodiments in accordance with the present disclosure may not be limited to virtual environments. More generally, embodiments in accordance with the present disclosure may be practiced in any suitable shared storage system that can provide multiple simultaneous or concurrent access to the shared storage system to multiple computer systems. Merely for the purposes of illustration, however, embodiments according to the present disclosure will be explained in terms of virtual environment 100.

The virtual environment 100 in accordance with a particular embodiment of the present disclosure may be based on components comprising a virtual environment developed and marketed by VMware Inc. For example, the host machines 102 may be configured with the ESXi® hypervisor, and may collectively be referred to as a cluster of ESXi® hosts.

The virtualization manager 106 may be the vSphere® web client, which allows users (e.g., system administrators) to connect to a host machine 102 directly or over the Internet. Users may configure the virtual environment 100 via the vSphere® web client; for example, users may define VMs 12, deploy VMs 12 on host machines 102, define LUNs 144 from the distributed datastore 142, and so on. In some embodiments (not shown), the virtualization manager 106 may include a vCenter® server that the vSphere® web client may connect to in order to manage a cluster of hosts.

The distributed file system 148 can support the management of thin files and thick files. A thick file is fully allocated when it is created; e.g., creating a 20 GB thick file would result in 20 GB of storage allocated to the file. A thin file is a file that is allocated storage only upon "first writes" to regions in the file. For example, creating a 20 GB thin file would result in 0 storage allocated to the file. Later, when data is first written to a region in the thin file, storage is allocated for that region of the file. The disclosure will now turn to a brief description of some metadata called file descriptors used in the distributed file system 148 to manage file storage.

FIGS. 2 and 2A-2D illustrate file descriptors for a distributed file system 148 (FIG. 1) in accordance with some embodiments. A file comprises a file descriptor and the actual data (file data) that is the subject of the file (e.g., image data, textual data, etc.). A file descriptor may contain data about a file, as compared to the actual file data stored by the file. The general format of a file descriptor 200 in accordance with some embodiments is shown in FIG. 2. The file descriptor 200 may comprise two sections; file metadata 222 and address region 224. The file metadata 222 may include descriptive information about the file such as the file owner, access permissions, creation and modification dates, and so on. The address region 224 may comprise address information (pointers) that identify file blocks on the logical volume 146 which store the file data. A file block is an allocatable resource of the distributed file system 148 that can be allocated to a file.

File descriptors can be configured for different addressing modes to accommodate different file sizes. FIG. 2A for example, shows a file descriptor 202 of a file configured for "small data" mode. In a "small data" file, the file data is stored in the address region 224 itself. The size of a "small data" file is therefore limited to the size of the address region 224. In some embodiments, for example, the address region 224 may be 1 KB in size; although other sizes (e.g., 2 KB, 2.5 KB, etc.) may be used in other embodiments.

FIG. 2B shows a file descriptor 204 configured for an addressing mode called sub block mode. In this addressing mode, the address region 224 may comprise a number n of address slots 224a, 224b, ... 224n. Each address slot 224a, 224b, ... 224n may contain a pointer to a sub block 232 that can hold a portion of the file data. The sub block 232 is resource of the distributed file system 148 that can be allocated to a file. In some embodiments, the sub block is 64 KB in size, and may be different sizes in other embodiments. Accordingly, in some embodiments, a "sub block" type file may have a maximum file size of n×68 KB, where n is the number of pointers in the address region 224. In some embodiments, a sub block type of file may be limited to a maximum of two sub blocks (128 KB file size). When the size of a file exceeds 128 KB, the file may be converted to the next addressing mode to contain more data.

FIG. 2C shows a file descriptor 206 configured for direct addressing mode ("direct mode"), where each address slot in the address region 224 contains a pointer to a file block 234. In accordance with the present disclosure, the file block 234 may be a small file block (SFB) or a large file block (LFB). For some files, each address slot may point to an SFB type of file block 234. In other files, each address slot may point to an LFB type file block 234.

The term "file block" may refer to allocatable units of storage on the logical volume 146 (FIG. 1). The term file block was used above to refer to a resource of the distributed file system 148 that can be allocated to a file. The present disclosure introduces different size file blocks: small file blocks (SFBs) and large file blocks (LFBs), which may be expressed in terms of the units of storage (called file blocks) on the logical volume 146 that can be allocated to files by the distributed file system 148. In order to avoid confusing the original file block with small file blocks and large file blocks of the present disclosure, the term "allocation unit" may be used in place of "file block" to refer to an allocatable unit of storage for file data. In some embodiments, for example, the allocation unit may be the lowest granularity size block of storage on the logical volume 146 that may be allocated to files by the distributed file system 148. An exception is the sub block 232 described above, which is a special case for very small files. For other files, however, the distributed file system 148 may allocate storage for files in increments of allocation units in accordance with the present disclosure, as will now be explained.

In accordance with the present disclosure, allocation units for a file may be allocated by the distributed file system 148 in fixed-size increments of LFB type file blocks and SFB type file blocks. In accordance with some embodiments of the present disclosure, for example, each SFB type file block (or simply "SFB") may comprise a fixed number $n_{SFB}$ of allocation units. In some embodiments, $n_{SFB}$ may be 1 (exactly one allocation unit per SFB). It will be appreciated, however, that in principle $n_{SFB}$ is not necessarily limited to 1 and may be greater than 1. In accordance with the present disclosure, each LFB type file block (or simply "LFB") may comprise a fixed number $n_{LFB}$ of allocation units, where $n_{LFB} > n_{SFB}$. In some embodiments, $n_{LFB}$ may be tens to hundreds of times greater than $n_{SFB}$; and in general $n_{LFB} = i \times n_{SFB}$, where i is an integer greater than 1. These aspects of the present disclosure are described in more detail below.

FIG. 2D shows a file descriptor 208 configured for indirect addressing ("indirect mode"), where each address slot in the address region 224 points a pointer block 236, rather than to a file block 234. Each pointer block 236, in turn, may point to file block 234. In some embodiments, each pointer block 236 may point to a set of SFB type file blocks 234 or to a set of LFB type file blocks. FIG. 2D, for example, shows an example of a pointer block 236a configured to point to LFB type file blocks 234 and a pointer block 236b configured to point to SFB type file blocks 234. It can be appreciated that indirect addressing mode can provide for much greater files sizes than direct addressing mode. The maximum file size may be computed according to n×p×(m×allocation_unit_size), p is the number of pointers in a pointer block 236, and the remaining terms are defined above. Merely to illustrate an example, p may be 8 K ($2^{13}$).

The indirect addressing mode depicted in FIG. 2D represents one level of indirection: in other words, the pointer in an address slot in the address region 224 points to a pointer block 236, which in turn points to a file block 234. Accordingly, the indirect addressing mode in FIG. 2D may be referred to as "single indirect addressing." Although not shown, in some embodiments, double indirect addressing may be provided, in which pointers in the address region 224 each point to a pointer block 236. Pointers in the pointer block 236, in turn, each points to another pointer block, which then points to file blocks 234.

FIGS. 3A-3E illustrate a logical representation of storage in a logical volume 146 (FIG. 1) created in accordance with the present disclosure. In FIG. 3A, storage on the logical volume 146 may be configured or otherwise organized as a set of contiguous allocation units. The figures diagramatically illustrates the allocation units as a linear array. The size of each allocation unit may be any suitable size, and for the purposes of explanation can be assumed to be 1 MB without loss of generality. As explained above, the allocation unit may be more commonly referred to as a file block, but the term "allocation unit" is being used to avoid confusion with SFB type file blocks and LFB type file blocks.

In FIG. 3B, the allocation units that comprise the logical volume 146 may be grouped or otherwise organized into LFBs. The number of allocation units per LFB can be any suitable number. However, for the purpose of explaining the example, each LFB may comprise 512 contiguous allocation units without loss of generality. Assuming an allocation unit is 1 MB in size, then each LFB type file block is 512 MB in size.

In FIG. 3C, the LFBs on the logical volume 146 may be grouped or otherwise organized into contiguous clusters of LFB type file blocks referred to as LFB resource clusters. The number of LFBs per LFB resource cluster can be any suitable number. However, for the purpose of explaining the example, each LFB resource cluster may comprise 512 contiguous LFB type file blocks.

In FIG. 3D, the LFB resource clusters may be grouped or otherwise organized into contiguous groups of LFB resource clusters referred to as LFB cluster groups. In some embodiments, for example, each LFB cluster group may comprise 512 contiguous LFB resources clusters. Each LFB cluster group may comprise $512^2$ (26,112) LFB type file blocks.

In FIG. 3E, one or more LFB cluster groups selected from one end of the logical volume 146 may be broken down or otherwise partitioned into a set of SFB type file blocks. In some embodiments in accordance with the present disclosure, for example, one LFB cluster group may be broken down into a set of contiguous SFB type file blocks. Assuming for discussion purposes that each SFB comprises exactly one allocation unit, then one LFB cluster group can provide $512^3$ (13,369,344) SFBs.

In accordance with the present disclosure, the SFBs shown in FIG. 3E may be organized into resource clusters and cluster groups in the same hierarchical manner as shown in FIGS. 3B, 3C, and 3D for LFBs. Thus, for example, in some embodiments, the $512^3$ (13,369,344) SFBs from the one LFB cluster group may be organized into SFB resource clusters comprising 512 contiguous SFBs per SFB resource cluster, thus defining $512^2$ (26,112) contiguous SFB resource clusters from the one LFB cluster group. The SFB resource clusters, in turn, may be organized into SFB cluster groups comprising 512 SFB contiguous resource clusters per SFB cluster group, thus defining 512 contiguous SFB cluster groups from one LFB cluster group.

Figure 4:
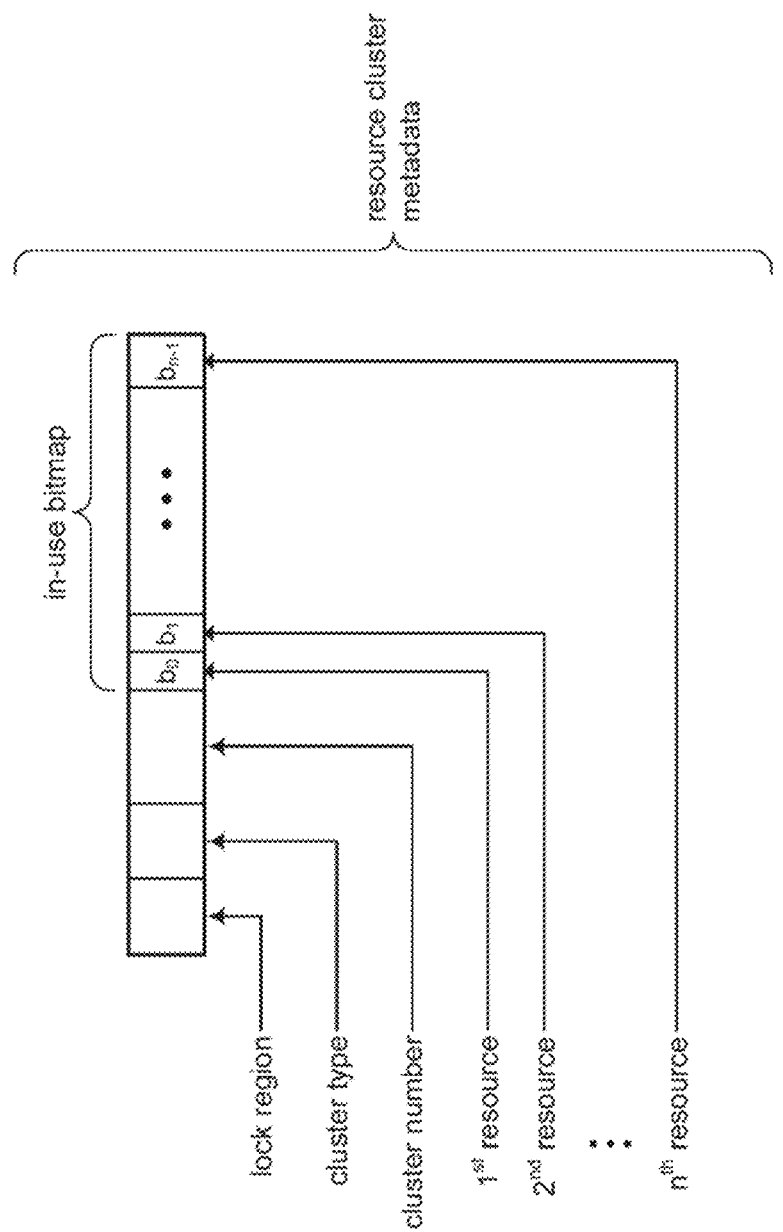
FIG. 4 illustrates an example of resource cluster metadata.

FIG. 4 shows metadata associated with a resource cluster in accordance with the present disclosure. The resource cluster (SFB resource cluster, LFB resource cluster) of a given resource (SFB, LFB) may be associated with its own resource cluster metadata. Resource cluster metadata may reside on the storage disks (e.g., hard disk drives 122, FIG. 1) that comprise the logical volume 146. The resource cluster metadata may include a lock region to indicate that the corresponding resource is locked by or on behalf of a host machine (e.g., 102, FIG. 1) accessing the resource cluster. A cluster type field may be provided in the resource cluster metadata to indicate whether the resource cluster is a cluster of LFB type file blocks or a cluster of SFB type file blocks.

The resource cluster metadata may include a cluster number and an in-use bitmap. The cluster number may indicate the ordinal position of the resource cluster on the logical volume 146. Referring for a moment to FIG. 3C, for example, the LFB resource clusters may be referenced by its ordinal position from a first end of the logical volume 146. In some embodiments, the cluster numbering may start with 0. By the convention the LFBs may be numbered beginning at the first end of the logical volume 146. The cluster number in the resource cluster metadata for a SFB resource cluster would be defined in the same manner.

The in-use bitmap may comprise a set of bits that correspond to each resource (LFB file block or SFB file block) in the resource cluster. The bit number of a bit in the in-use bitmap may indicate the ordinal position of the corresponding resource. Thus, bit position 0 may refer to the $1^{st}$ resource in the resource cluster, bit position 1 may refer to the $2^{nd}$ resource in the resource cluster, and so on where bit position (n−1) refers to the $n^{th}$ resource in the resource cluster. When a resource is allocated to a file its corresponding in-use bit may be set to a first state (e.g., logic '1'), and conversely when the resource is not allocated to a file its corresponding bit may be set to a second state (e.g., logic '0').

The resources comprising a resource cluster may be addressed using the cluster number and the in-use bitmap of the resource cluster according to the following:

$$\text{offset} = (cnum \times N_{rsc} + rnum) \times S_{rsc},$$

where, offset is the offset from the base address of the location in the logical volume 146 where the resources begin (e.g., the location of the first end shown in FIG. 3B), cnum is the cluster number of the resource cluster, by convention the numbering begins with zero (0) for the first resource cluster of a given type of resource (SFB, LFB) on the logical volume 146

$N_{rsc}$ is the number of resources in the resource cluster; in some embodiments, for example, every resource cluster (LFB and SFB) may have the same number of resources; in a particular embodiment, for example, this number is 512, rnum is the ordinal number of the resource within the resource cluster; as explained above, by convention the numbering begins with zero (0) for the first resource and the $n^{th}$ resource will have a resource number of (n−1), $S_{rsc}$ is the size of the resource; in some embodiments, for example, an SFB file block may be 1 MB in size and an LFB file block may be 512 MB in size.

The resource cluster metadata may be initialized at the same time the logical volume 146 is created, where the LFB and SFB file blocks are mapped (as shown in FIGS. 3A-3E) to disk sectors of the underlying physical disks that comprise the logical volume 146. At the time of creation of the logical volume 146, one of the LFB cluster groups may be divided into SFBs, so that the logical volume 146 has a set of SFBs that can be allocated to files and a set of LFBs that can be allocated to files. Additional SFBs may be defined as needed. These aspects of the present disclosure are described in more detail below.

As can be seen, any given disk sector on the logical volume 146 may be part of an LFB file block and may be part of an SFB file block when the LFB file block is further divided into SFBs. For example, the mapping shown in FIG. 3E may represent the initial configuration of a new logical volume 146 created in accordance with the present disclosure. The initial mapping results in a portion of the logical volume 146 having two different sized file blocks (LFBs and SFBs) overlaying each other at one end of the logical volume 146.

Figure 5A:
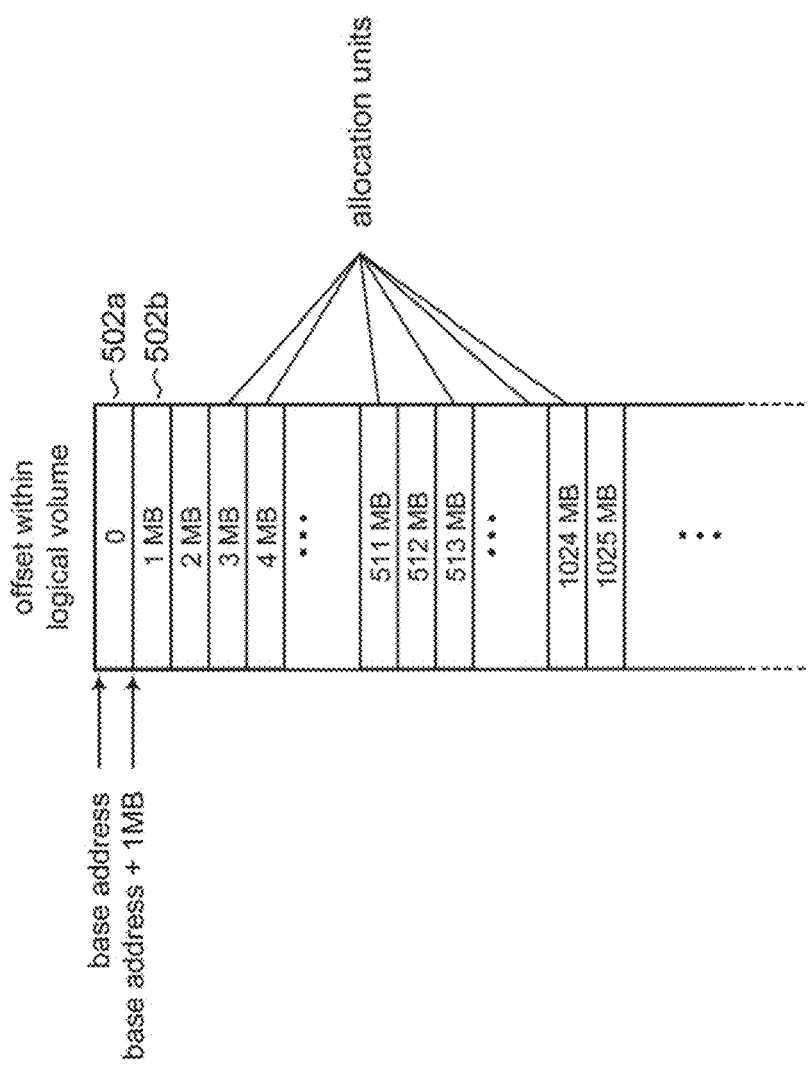
FIGS. 5A-SD illustrate offset addressing on a logical volume in accordance with the present disclosure.

FIGS. 5A-5D illustrate an example of the organization and addressing of LFBs and SFBs on a logical volume (e.g., 146, FIG. 1) in accordance with the present disclosure when the logical volume is created, as depicted in FIGS. 3A-3E for example. FIG. 5A shows an initial partitioning of storage on a logical volume into a collection of contiguous allocation units. The allocation units may be any suitable size for a given distributed file system. Merely for the purpose of illustrating the example, the size of the allocation units can be assumed to be 1 MB without loss of generality. The region of contiguous allocations units on the logical volume may be identified by a base address, and the first allocation unit 502a may begin at that base address (offset=0). The adjacent allocation unit 502b may have an address that is offset by 1 MB (offset=1 MB) from the base address, and so on for subsequent adjacent allocation units.

Figure 5B:
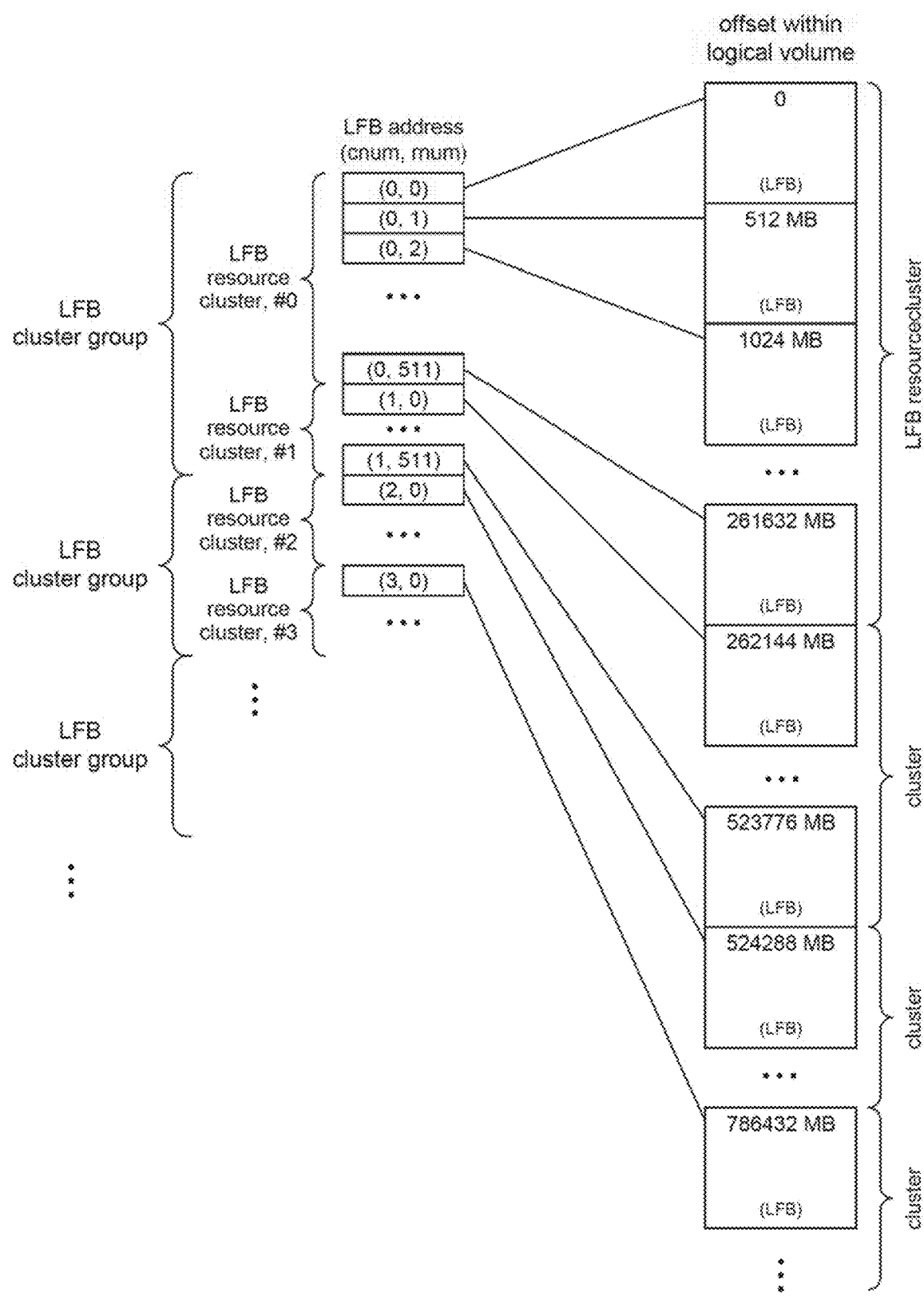

FIG. 5B illustrates the organization of the allocation units into LFB type file blocks. In the example shown, each LFB comprises 512 allocation units for a size of 512 MB per LFB. The figure shows the LFB offsets within the logical volume. As explained above, groups of contiguous LFBs may be organized as resource clusters, and in the example shown each LFB resource cluster comprises 512 contiguous LFBs.

The LFBs may be addressed in terms of the resource cluster they belong to and their ordinal position with that resource cluster. As shown in FIG. 4, the address of an LFB may comprise the cluster number (cnum) of the resource cluster that the LFB is in, and a resource number (mum) that indicates the ordinal position of the LFB within the resource cluster. The offset value may be computed as explained above using cnum and mum to map the LFB to a location in the logical volume. FIG. 5B shows the offsets of some LFBs computed using their respective addresses.

Groups of LFB resource clusters may further be organized as LFB cluster groups. In the example shown in FIG. 5B, an LFB cluster group comprises 2 LFB resource clusters. It will be understood, that in other embodiments an LFB cluster group may comprise more than 2 LFB resource clusters. The hierarchical organization of LFBs allows for concurrency among multiple host machines (e.g., 102, FIG. 1) to access storage on the logical volume for file creation. This aspect of the present disclosure will be discussed further below.

FIG. 5C shows that an LFB cluster group may be broken down (LFB breaking) into a set of SFB type file blocks. For example, an LFB cluster group may be broken down during creation of the logical volume in order to initialize the logical volume with SFBs. As will be explained below, LFB breaking may be performed when additional SFBs are needed by the distributed file system. In the example shown in FIG. 5C, using the illustrative configuration of LFBs shown in FIG. 5B and assuming that an SFB is one allocation unit on the logical volume, an LFB cluster group can yield 524,288 (2×512×512) contiguous SFB type file blocks. FIG. 5C shows that contiguous groups of SFBs may be organized as SFB resource clusters of 512 SFBs each.

FIG. 5D shows the set of SFBs organized into SFB resource clusters and SFB cluster groups using the same organizational structure as for the LFBs. The cluster number (cnum) and resource number (mum) convention used to address LFBs may also be used with SFBs to compute their offsets in the logical volume. FIG. 5D shows the offsets of some SFBs computed using their respective SFB addresses.

The discussion will now turn to file creation in accordance with the present disclosure in a distributed file system (e.g., 148, FIG. 1) deployed on a logical volume (e.g., 146, FIG. 1) configured in accordance with the present disclosure. As explained above, a distributed file system in accordance with the present disclosure may support two kinds of files: thin file and thick file. In some embodiments, when a thin file is created, only the file metadata (e.g., file descriptor 200, FIG. 2) for the file are created and stored. Allocation units (storage) from the logical volume are not allocated to the file at file creation time. Rather, the allocation units for a thin file are allocated as needed when write operations are performed on the thin file. By comparison, when a thick file is created, the file metadata are created and stored, as with a thin file, but unlike a thin file all the storage (e.g., allocation units) for the thick file are allocated from the logical volume prior to writing any file data to the file. In other words, a thick file is instantiated prior to any write operations being performed on the thick file.

Figure 6:
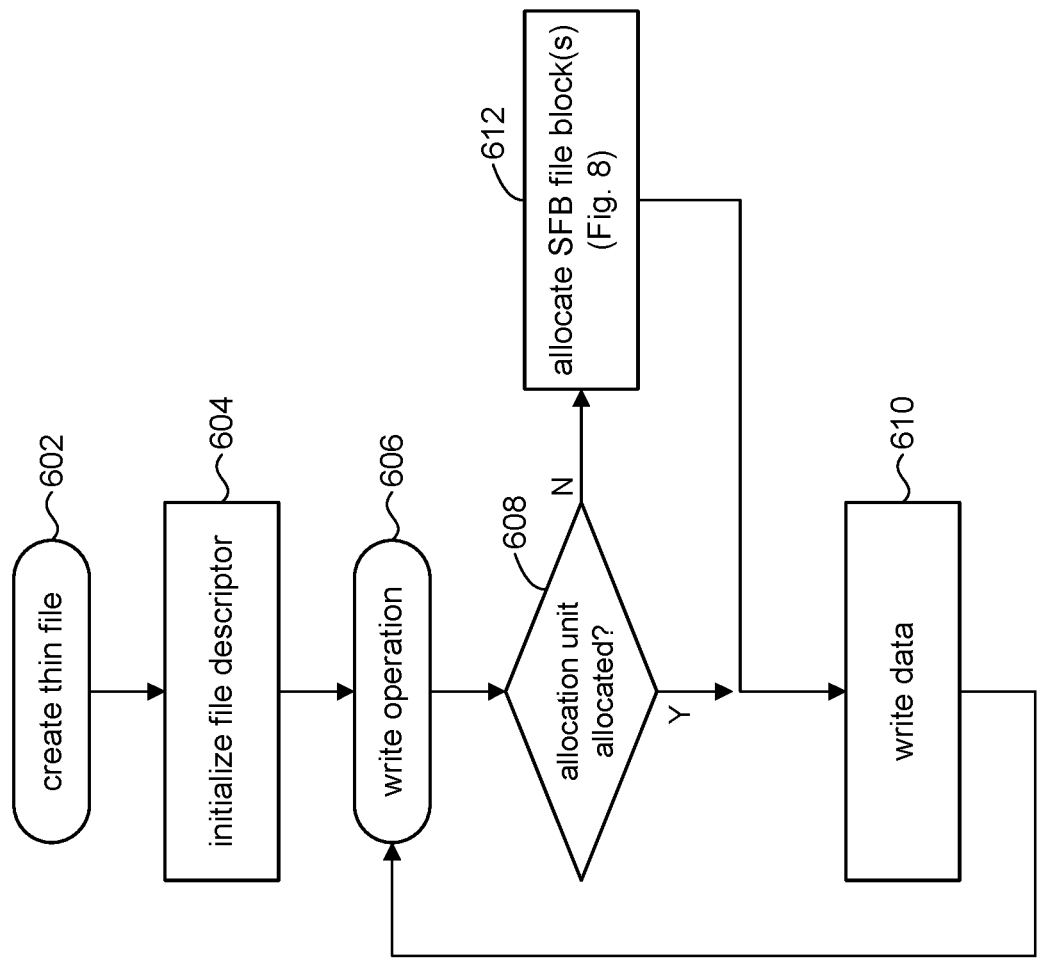
FIG. 6 illustrates a flow for creating a thin file.

FIG. 6 illustrates processing during the life of a thin file. At block 602, the host machine (e.g., 102, FIG. 1) may perform a create operation to create a thin file in the distributed file system. At block 604, the host machine may allocate storage for a file descriptor and initialize it with information associated with the thin file, such as the name of the file, creation date, access permission, and so on. However, no storage is allocated at this time; the thin file at this point may be deemed ready to be written to.

At block 606, the host machine may perform a write operation on the thin file. The write operation may include an offset into the thin file that specifies the start location for the data. At block 608, the host machine may determine whether the offset addresses a region of the file that is allocated with storage. If the offset refers to allocated storage, then at block 610 the host machine may write the data specified in the write operation into the allocation unit determined by the offset. The process may continue at block 606 with subsequent write operations.

Returning to the decision block at block 608, if the offset specified in the write operation refers to a region of the file that does not have any allocated storage, then at block 612 the host machine may allocate one or more allocation units to the thin file. In some embodiments, for example, this operation may be referred to as an extend operation. In accordance with the present disclosure, the host machine may extend the thin file using one or more SFB type file blocks, depending on how much data is to be written; the processing and delay incurred is sometimes referred to as "first write" penalty. This aspect of the present disclosure is discussed in more detail below. After the thin file has been extended by an SFB, processing may proceed to block 610 as described above.

Figure 7:
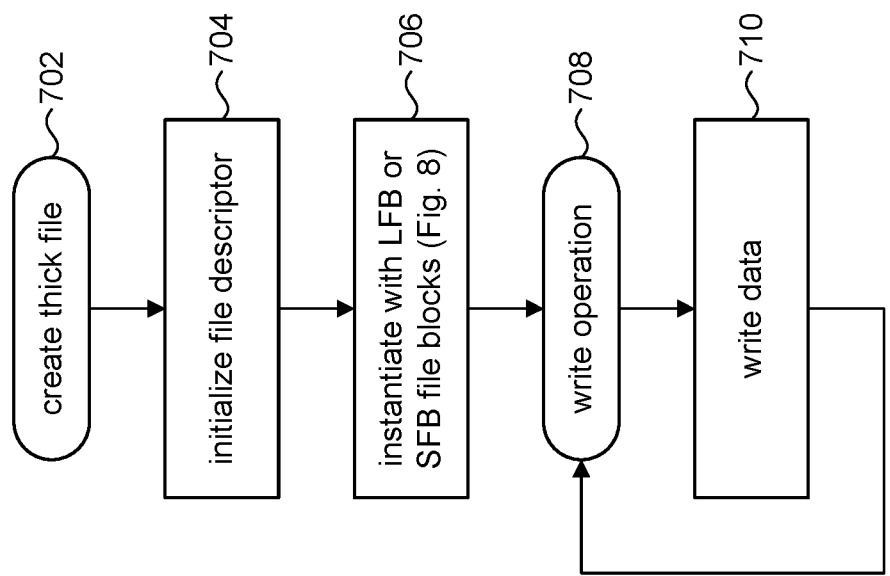
FIG. 7 illustrates a flow for creating a thick file in accordance with the present disclosure.

FIG. 7 illustrates processing during the life of a thick file. At block 702, the host machine may perform a create operation to create a thick file of a specified size in the distributed file system. At block 704, the host machine may allocate storage for a file descriptor and initialize it with information associated with the thick file, such as the name of the file, creation date, access permission, and so on.

At block 706, the host machine may instantiate the thick file by allocating (e.g., via an extend operation) some number of allocation units to the thick file totaling a size greater than or equal to the specified file size. In accordance with some embodiments of the present disclosure, if the specified size of the file is greater than or equal to the size of an LFB, then the thick file may be i with one or more LFBs to instantiate the thick file with the specified size. If the specified size of the file is less than the size of an LFB, then the thick file may be extended with one or more SFBs to instantiate the thick file. In some embodiments, the threshold for whether to use SFBs to instantiate a thick file instead of LFBs may be based on a percentage of the size of an LFB. For example, if the size of the thick file is greater than x % of the size of an LFB, then the thick file may be instantiated with an LFB; otherwise, the thick file may be instantiated using SFBs. At this point, the thick file is deemed instantiated and may be written to.

At block 708, the host machine may perform a write operation on the thick file. The write operation may include an offset into the thick file that specifies the start location for the data. At block 710, the host machine may write the data into the allocation unit determined by the offset. The process may continue at block 708 with subsequent write operations.

Figure 8:
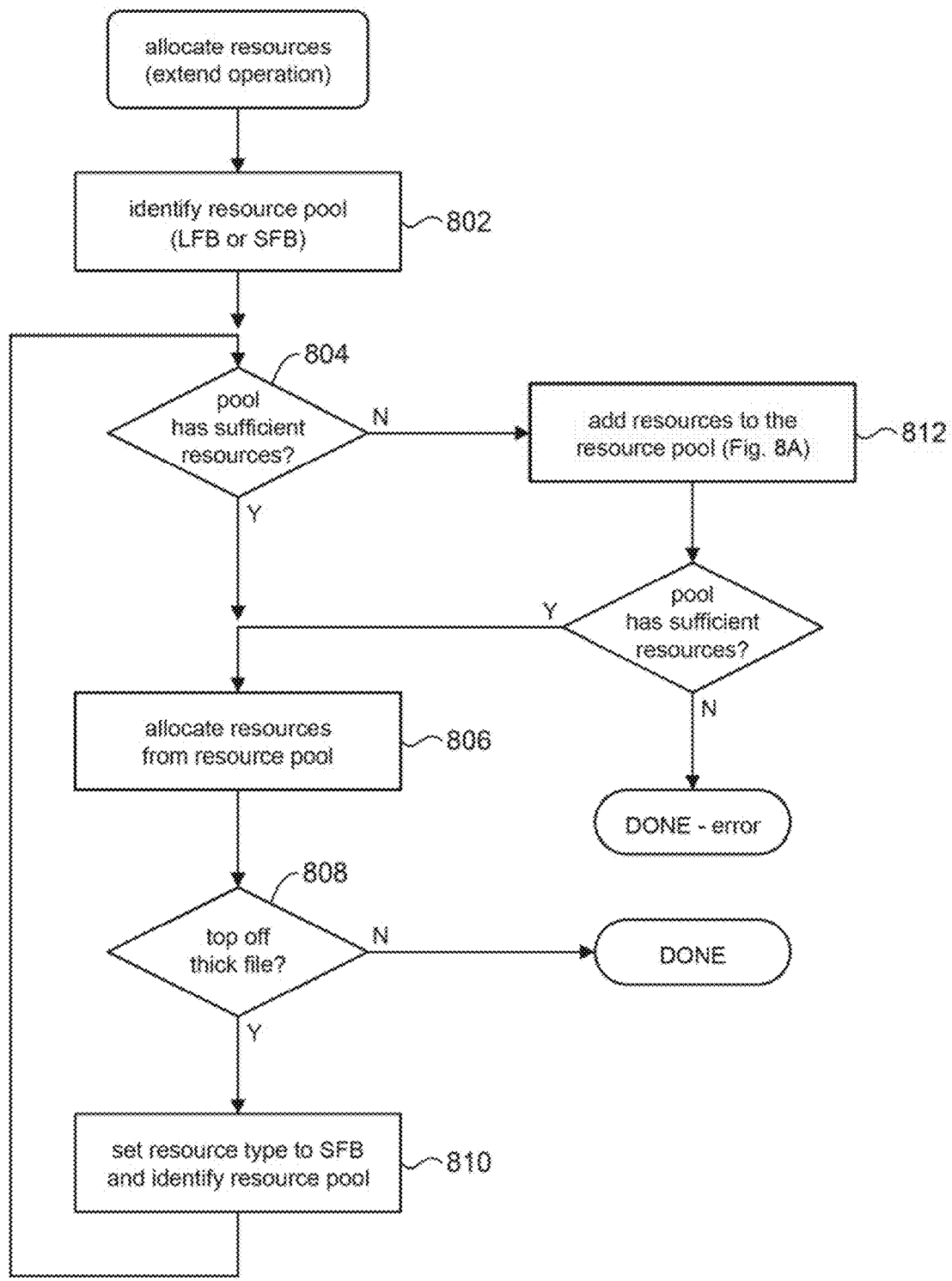
FIG. 8 illustrates a flow for extending files in accordance with the present disclosure.

Referring to FIG. 8, and with reference to earlier figures, the discussion will now turn to a high level description of some heuristics that can serve to represent processing in the host machine (e.g., 102, FIG. 1) to extend thick and thin files in accordance with the present disclosure. In some embodiments, for example, the host machine may include computer executable program code, which when executed by a computer system (e.g., 1002, FIG. 10), may cause the computer system to perform processing in accordance with FIG. 8.

At block 802, when the host machine receives an extend operation to extend a file with SFBs or LFBs, the host machine may create a resource pool that corresponds to the resource type (LFB resources or SFB resources) specified for the extend operation. A resource pool may comprise one or more resource clusters of a given type, namely SFB resource clusters or LFB resource clusters. If the extend operation calls for extending a file using SFBs, then the host machine may create a resource pool of SFB resource clusters. Similarly, if the extend operation calls for extending a file using LFBs, then the host machine may access a resource pool of LFB resource clusters.

At 804, the host machine may determine whether the resource pool of the given type (SFB or LFB) has sufficient resources to perform the extend operation. In some embodiments, for example, the extend operation may specify a size that the file should be extended by. The size may be expressed as a number of SFBs or LFBs. For example, the extend operation may specify to extend the file by n SFBs, or by m LFBs. The in-use bits (FIG. 4) for each resource cluster in the resource pool can provide a count of how many resources are not yet allocated (i.e., free) in each resource cluster. A total count of free resources among the resource clusters in the resource pool can be compared to the size specified for the extend operation to determine if there are sufficient resources in the resource pool to perform the extend operation. If the resource pool of the given type does not have sufficient resources to perform the extend operation, then processing may proceed to block 812 which is discussed below; otherwise, processing may continue.

At block 806, the host machine may allocate enough free resources identified in the resource clusters of the resource pool sufficient to meet the size specified in the extend request. In some embodiments, for example, for each resource that is to be allocated to the file, the in-use bit in the resource cluster that corresponds to the resource may be set (e.g., logic '1') to indicate that the resource is now "in use." The address (cnum, mum) of each allocated resource may be copied into the address region 224 (FIG. 2) of the file descriptor for the file.

At block 808, the host machine may determine whether to top off a thick file with one or more SFBs. In accordance with the present disclosure, "topping off" applies to a thick file that is instantiated using LFBs. A thick file that is instantiated with only LFBs may not be deemed to be space efficient. Consider a thick file that is specified for a size of 1034 MB. That thick file can be instantiated with three LFBs, at 512 MB each. Using three LFBs, however, would result in 502 MB of excess capacity since only 1034 MB of capacity was specified. This may be undesirable. Accordingly, in some embodiments in accordance with the present disclosure, instead of allocating a third LFB, the thick file may be topped off using ten 1 MB-sized SFBs, thus instantiating the thick file with precisely the specified 1034 MB of storage, thus avoiding excess capacity.

Accordingly, at block 808 if the specified resource type for the extend operation is SFBs (e.g., thin file or thick file extended using SFBs per block 706, FIG. 7), then topping off with SFBs is not necessary, of course, and the extend operation may be deemed complete (DONE). On the other hand, if a thick file is being extended using LFBs, then the host machine may determine whether the excess capacity (if any) in the final LFB that is allocated to the thick file exceeds a threshold. In the example above, for instance, the excess capacity is 502 MB. The threshold may be expressed in any suitable manner. For example, the threshold may be expressed as a percentage of the size of the LFB; e.g., if the final LFB in the thick file has excess capacity in excess of x % of the size of the LFB, then top off the thick file using SFBs. The threshold may be expressed as a hard number; e.g., if the final LFB in the thick file has excess capacity greater than x MB, then top off using SFBs, and so on.

At block 810, the host machine may initialize some data for a topping off operation. For example, the host machine may set the resource type to SFB resources, and identify the resource pool that corresponds to SFB resources. The host machine may de-allocate the final LFB that was allocated to the thick file, thus leaving the thick file with additional un-allocated capacity which will be filled with SFBs. Processing may then proceed to block 804 to complete the instantiation of the thick file using SFBs. The resulting thick file may comprise one or more LFBs and one or more SFBs.

Returning to block 804, if the host machine determines that the resource pool of the given type does not have sufficient resources to perform the extend operation, then processing may proceed to block 812 to allocate additional resources of the given resource type (LFB or SFB) to the resource pool sufficient to perform the extend operation. If additional resources can be allocated to the resource pool, the processing may proceed to block 806. Otherwise, processing may terminate with an ERROR.

Figure 8A:
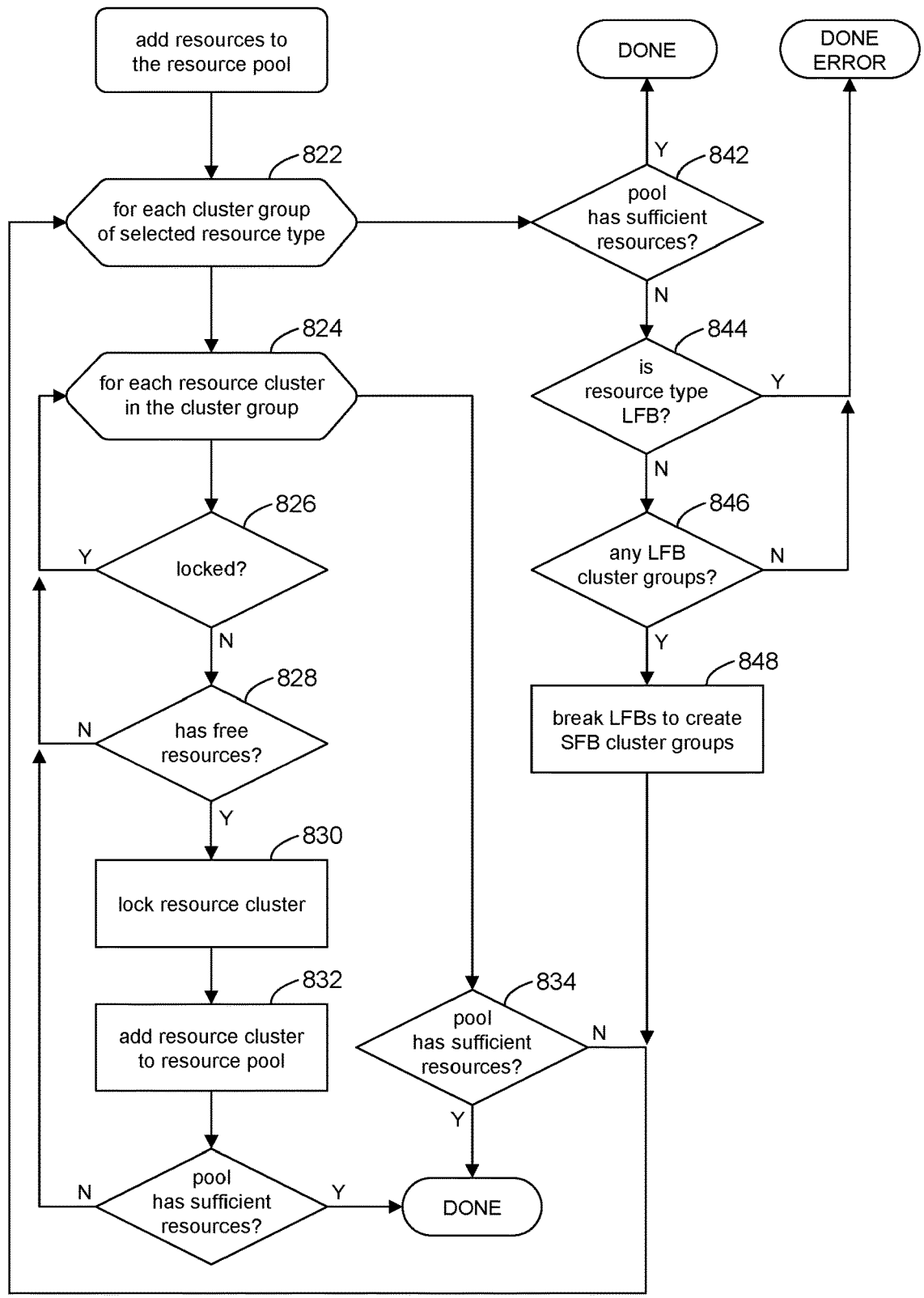
FIG. 8A illustrates a flow for allocating resources to a resource pool in accordance with the present disclosure.

Referring to FIG. 8A, and with reference to earlier figures, the discussion will now turn to a high level description of some heuristics that can serve to represent processing in the host machine (e.g., 102, FIG. 1) to add resources (SFBs or LFBs) to a resource pool of resources of a given type in accordance with the present disclosure. In some embodiments, for example, the host machine may include computer executable program code, which when executed by a computer system (e.g., 1002, FIG. 10), may cause the computer system to perform processing in accordance with FIG. 8A.

At block 822, the host machine may process one or more cluster groups of the given resource type. For example, if the resource type required for the extend operation are LFB resources, then the host machine may process one or more cluster groups for LFB resources. Likewise, if the resource type required for the extend operation are SFB resources, then the host machine may process one or more cluster groups for SFB resources. The host machine may process each cluster group of the given resource type as follows:

At block 824, the host machine may process one or more of the resource clusters in a given cluster group. Each resource cluster in the given cluster group may be processed as follows:

At block 826, the host machine may determine whether a given resource cluster in the given cluster group is in use (locked), for example, by another host machine (e.g., 102, FIG. 1) accessing the distributed file system. In some embodiments, the host machine may make this determination by reading in the metadata for the given resource cluster from disk and inspecting the lock region (FIG. 4). In some embodiments, for example, the lock region may comprise a one-bit value that indicates the resource cluster is in use (e.g., the bit is set) or is not in use (e.g., the bit is cleared). If the given resource cluster is in use, then processing may return to block 824 to process the next resource cluster in the given cluster group; otherwise, processing may continue with the given resource cluster.

At block 828, the host machine may determine if the given resource cluster contains any free resources. In some embodiments, for example, the host machine may use the in-use bitmap (FIG. 4) in the metadata for the given resource cluster to identify any free resources. If a resource is allocated, then its corresponding in-use bit in the bitmap may be set, and conversely if the resource is free then its corresponding in-use bit may be cleared. If there are no free resources in the given resource cluster, processing may return to block 824 to process the next resource cluster in the given cluster group; otherwise, processing may continue.

At block 830, the host machine may "lock" the given resource cluster when the given resource cluster has one or more free resources. In some embodiments, for example, the host machine may write information into the lock region of the metadata associated with the given resource cluster; e.g., the host machine may set a lock bit in the lock region. The host machine may then write the metadata back down to the disk. Since the logical volume is distributed and thus accessible at the same time by many host machines, the lock avoids multiple host machines from accessing the given resource cluster. Accordingly, the read and write operations to read the metadata and write the modified metadata back down to the disk should be synchronous so that one host machine cannot read the metadata at the same time another host machine is writing the metadata. In some embodiments, for example, the IOs can be via SCSI-2 Reservation or VAAI Atomic Test-and-Set (ATS), and so on.

At block 832, the host machine may add the locked resource cluster to the resource pool, thus increasing the number of free resources in the resource pool. If the resource pool has sufficient free resources to perform the extend operation (FIG. 8), then processing may be deemed complete (DONE). Otherwise, processing may return to block 824 to process the next resource cluster in the given cluster group to add more free resources to the resource pool.

At block 834, after all the resource clusters in the given cluster group have been processed, if the resource pool has sufficient free resources to perform the extend operation (FIG. 8), then processing may be deemed complete (DONE). Otherwise, processing may return to block 822 to process the next cluster group as explained above.

At block 842, all the cluster groups of the given resource type have been processed. For example, if the resource type required for the extend operation are LFB resources, then all of the cluster groups for LFB resources have been processed at this point. Likewise, if the resource type required for the extend operation are SFB resources, then all of the cluster groups for SFB resources have been processed at this point. If the resource pool has sufficient free resources to perform the extend operation (FIG. 8), then processing may be deemed complete (DONE). If, on the other hand, the resource pool still has insufficient resources to perform the extend operation, then processing may continue.

At block 844, if the resource type that is required for the extend operation are LFB resources then the host machine may throw an ERROR, since all the cluster groups for LFB resources have been processed; in other words, there are insufficient LFBs on the logical volume to perform the extend operation. On the other hand, if the resource type that is required for the extend operation are SFB resources then processing may continue.

At block 846, the host machine may determine if there are any LFB cluster groups on the logical volume from which to generate additional SFB cluster groups. If there are no more LFB cluster groups then the host machine may throw an ERROR, since no additional SFB cluster groups can be generated and hence there are insufficient SFBs on the logical volume to perform the extend operation. If there is at least one LFB cluster group, then processing may continue.

Figures 9A, 9B, 9C:
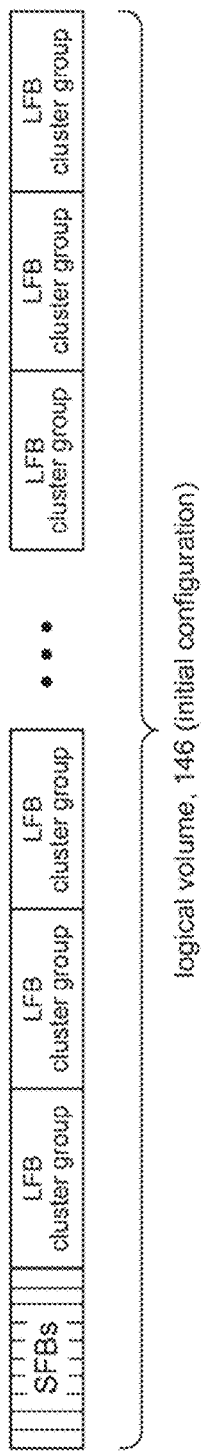
FIGS. 9A-9C illustrate LFB breaking in accordance with the present disclosure.

At block 848, the host machine may break an LFB cluster group (LFB breaking) to generate additional SFB cluster groups (illustrated in FIGS. 9A-9C). Processing may proceed to block 822 so that the newly generated SFB cluster groups may be processed as described above.

FIG. 9A-9C illustrate LFB breaking in accordance with the present disclosure. FIG. 9A illustrates an initial configuration of a logical volume 146, showing the LFBs organized as LFB cluster groups and an initial LFB cluster group having been broken down into SFBs. The SFBs may be organized into SFB resource clusters and SFB cluster groups (FIG. 5D).

FIG. 9B illustrates the configuration of the logical volume 146 after some SFBs and LFBs have been allocated (e.g., per FIGS. 8 and 8A). In some embodiments, SFBs may be allocated (shaded region) from a first end of the logical volume 146 and, likewise, LFBs may be allocated (shaded region) from a second end of the logical volume 146.

FIG. 9C illustrates the configuration of the logical volume 146 after an LFB cluster group 902 (FIG. 9B) has been broken down into SFBs 912. In accordance with some embodiments, LFB breaking may be done with LFB clusters groups selected from the first end of the logical volume 146. The SFBs 912 generated by breaking the LFB cluster group 902 may be organized into SFB resource clusters and SFB cluster groups, such as shown in FIG. 5D for example.

Figure 10:
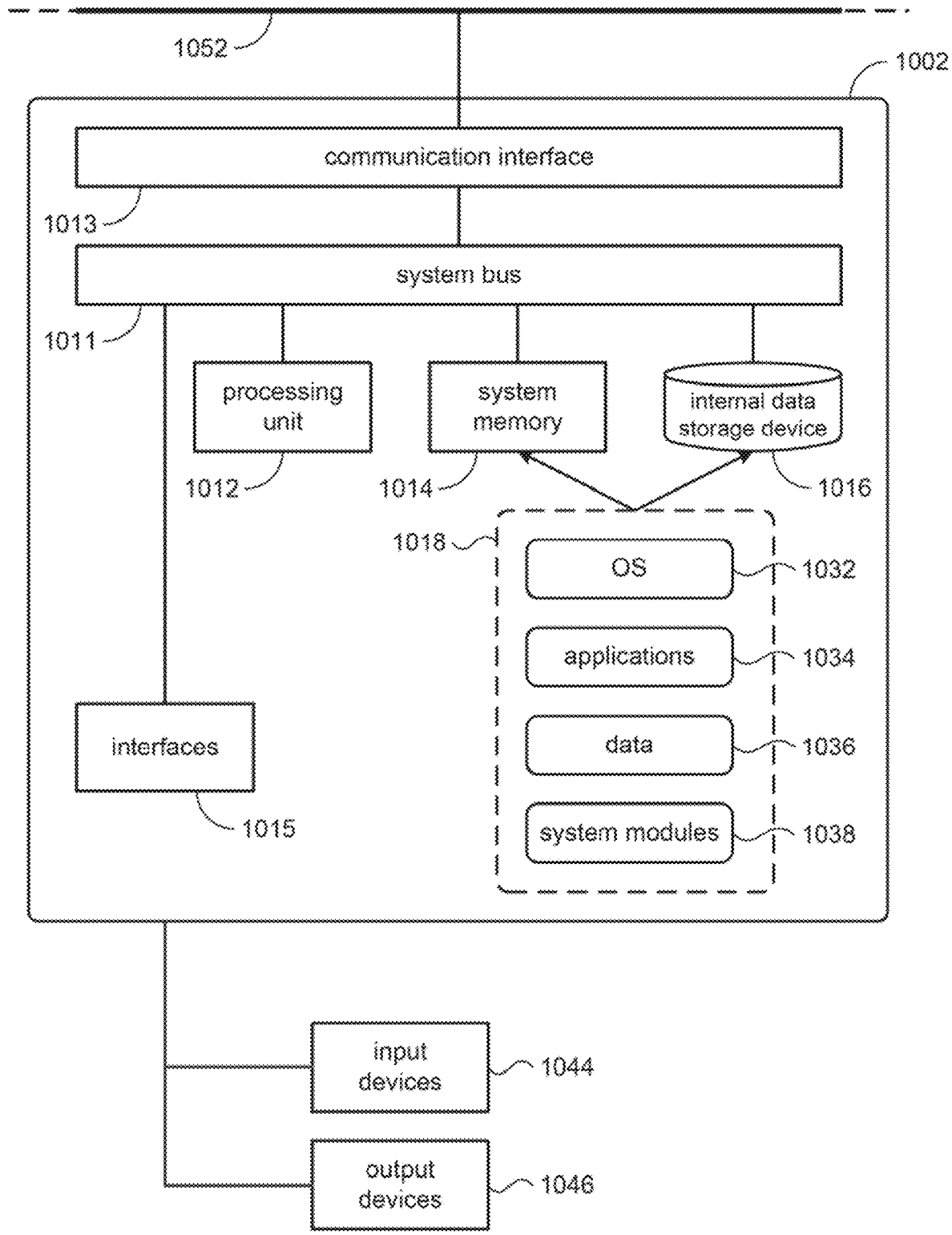
FIG. 10 shows an illustrative example of a computing component in accordance with the present disclosure.

Referring to FIG. 10, an illustrative implementation of a host machine 102 may include a computer system (computer device) 1002 having a processing unit 1012, a system memory 1014, and a system bus 1011. The system bus 1011 may connect various system components including, but not limited to, the processing unit 1012, the system memory 1014, an internal data storage device 1016, and a communication interface 1013. The communication interface 1013 may include network communication ports (e.g., for communication over TC/IP).

The processing unit 1012 may comprise a single-processor configuration, or may be a multi-processor architecture. The system memory 1014 may include read-only memory (ROM) and random access memory (RAM). The internal data storage device 1016 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 1016 and its associated non-transitory computer-readable storage media may provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 1014 and/or the internal data storage device 1016 may store various program and data modules 1018, including for example, operating system 1032, one or more programs 1034, program data 1036, and other program/system modules 1038. For example, in a computer system 1002 configured as a host machine 102 in the virtual environment 100, the programs 1034, which when executed, may cause the computer system 1002 to perform method steps of FIGS. 6, 7, 8, and 8A.

Access to the computer system 1002 may be provided by a suitable input device 1044 (e.g., keyboard, mouse, touch pad, etc.) and a suitable output device 1046, (e.g., display screen). The input and output devices 1044, 1046 may provide administrative access; e.g., access to host daemon 344.

The computer system 1002 may operate in a networked environment using logical connections via wired and/or wireless communications to one or more remote computers (not shown) over a communication network 1052. The communication network 1052 may be a local area network (LAN) and/or larger networks, such as a wide area network (WAN).

Technical Improvement

When the allocation units in a file system are allocated to a thick file in units of LFBs and/or SFBs, the time spent instantiating a thick file can be significantly reduced as compared to conventional file systems that have single-sized file blocks. The difference can be more pronounced in a virtualized environment (e.g., 100, FIG. 1), where the file system (e.g., 148) is a distributed file system that can be simultaneously accessed host machines (e.g., 102) in the virtualized environment. When files are created or grown, file system storage is consumed, and when files are truncated or removed, file system storage is freed. It is therefore important that host machines with access to the file system have a consistent view of the current state of the file system. Accordingly, a locking mechanism, may be employed to ensure mutual exclusion so that only one host machine at a time is consuming (allocating) or freeing (deallocating) a particular set of resources (SFBs, LFBs). The locking mechanism described above, for example, allows a host machine to lock a resource cluster to ensure sole access to the resource cluster during allocation and deallocation.

When the file system creates thick files, the time spent doing block allocation is generally proportional to the file size. On logical volumes that may be heavily fragmented, the time needed can be even greater because there are fewer free resources per resource cluster. Due to this, the time spent to create larger and larger files becomes disproportionately long, causing delays that cannot be ignored. As an example to illustrate this point, consider creation of a 20 GB thick file in a conventional file system where storage is allocated in units of a single-sized file block. Assume the file block size is 1 MB, and that the file blocks are grouped into resource clusters of 200 (1 MB) file blocks per resource cluster. The number of resource clusters needed to satisfy the overall allocation request would be:

resource clusters = total resources needed/resources per resource cluster, resulting in:

$$\frac{(20 \times 1024)}{200} = 102.4 \text{ resource clusters (103 resource clusters)}.$$

Generally, for each of the 103 resource clusters needed to satisfy the allocation request, a Read-Modify-Write sequence would be needed for the host machine to lock the resource cluster. After locks are obtained for the resource clusters, the resource bitmaps for each resource cluster must be updated. As blocks are allocated, the addresses to those blocks must be written in the file's file descriptor. An additional round of Read-Modify-Write is needed to release the locks on the resource clusters so that the resource clusters may be used by other host machines.

In the case of a newly configured logical volume, where all the file blocks are free, then allocating storage for a 20 GB thick file would involve locking 103 resource clusters, allocating storage from the 103 resource clusters, and unlocking the 103 resource clusters. As the volume usage grows and free resources become scarce, this process con take considerable longer as the number of free resources per resource cluster becomes smaller, and more resources clusters are required.

A file system in accordance with the present disclosure uses small file blocks (SFBs) and large file blocks (LFBs). When allocating thick files that are larger than the size of 1

LFB, then LFBs may be allocated to the thick file to satisfy the allocation request. The benefit of using LFBs becomes evident if we consider the example above of creating a 20 GB thick file. If we assume an LFB is 512 MB in size and LFBs are clustered in groups of 8 LFBs per resource cluster, then number of LFB resource clusters would be:

$$\frac{(20 \times 1024)}{8 \times 512} = 5 \text{ resource clusters.}$$

This is about a 20× reduction in the number of lock/unlock operations needed for LFB resources clusters as compared to the number of lock/unlock operations needed on the single-sized file block resource clusters described above, thus improving response times for thick file creation and improving overall response times among other host machines.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method for a file system on a logical volume, the method comprising:
    defining a plurality of file blocks of a first type, having a first size, from a plurality of allocation units that comprise the logical volume, the allocation units of the logical volume constituting files in the file system, each file block of the first type comprising a fixed number of allocation units;
    defining a plurality of file blocks of a second type, having a second size smaller than the first size, within a set of file blocks of the first type, each file block of the second type comprising a fixed number of allocation units less than the number of allocation units that comprise a file block of the first type; and
    instantiating a thick file of a specified size with allocation units of the logical volume totaling a size greater than or equal to the specified file size of the thick file, including:
        allocating one or more file blocks of the first type to the thick file and allocating one or more file blocks of the second type to the thick file when the specified file size of the thick file is greater than or equal to a size of a file block of the first type so that a total size of file blocks of the first type and the second type allocated to the thick file is greater than or equal to the specified file size of the thick file; and allocating only file blocks of the second type to the thick file when the specified file size of the thick file is less than the size of a file block of the first type.

2. The method of claim 1, further comprising instantiating the thick file prior to performing any write operations to the thick file.

3. The method of claim 1, further comprising extending a thin file with allocation units only during a write operation and only when one or more allocation units are required to store data associated with the write operation.

4. The method of claim 3, further comprising extending the thin file by allocating only file blocks of the second type to the thin file.

5. The method of claim 3, further comprising defining additional file blocks of the second type from one or more file blocks of the first type when there are insufficient file blocks of the second type for allocation to the thin file.

6. The method of claim 1, further comprising defining additional file blocks of the second type from one or more file blocks of the first type when there are insufficient file blocks of the second type for allocation to the thick file.

7. The method of claim 1, wherein file blocks of the first type are allocated from one end of the logical volume and file blocks of the second type are defined from file blocks of the first type at another end of the logical volume.

8. The method of claim 1, wherein the number of allocation units that comprise a file block of the first type is an integer multiple of the number of allocation units that comprise a file block of the second type.

9. The method of claim 1, wherein each file block of the second type comprises exactly one allocation unit.

10. The method of claim 1, wherein files blocks of the first type are grouped into a plurality of resource clusters of a first type and files blocks of the second type are grouped into a plurality of resource clusters of a second type, the method further comprising a plurality of host machines concurrently locking and accessing respective resource clusters of the first type or the second type to allocate file blocks of the first type or the second type, respectively.

11. The method of claim 10, wherein the plurality of resource clusters of the first type are grouped into a plurality of cluster groups of a first type and the plurality of resource clusters of the second type are grouped into a plurality of cluster groups of a second type.

12. A non-transitory computer-readable storage medium having stored thereon computer executable instructions, which when executed by a computer device, cause the computer device to:
define a plurality of file blocks of a first type, having a first size, from a plurality of allocation units that comprise the logical volume, the allocation units of the logical volume constituting files in the file system, each file block of the first type comprising a fixed number of allocation units;
define a plurality of file blocks of a second type, having a second size smaller than the first size, within a set of file blocks of the first type, each file block of the second type comprising a fixed number of allocation units less than the number of allocation units that comprise a file block of the first type; and
instantiate a thick file of a specified size with allocation units of the logical volume totaling a size greater than or equal to the specified file size of the thick file, including:
allocating one or more file blocks of the first type to the thick file and allocating one or more file blocks of the second type to the thick file when the specified file size of the thick file is greater than or equal to a size of a file block of the first type so that a total size of file blocks of the first type and the second type allocated to the thick file is greater than or equal to the specified file size of the thick file; and
allocating only file blocks of the second type to the thick file when the specified file size of the thick file is less than the size of a file block of the first type.

13. The non-transitory computer-readable storage medium of claim 12, further comprising computer executable instructions, which when executed by a computer device, further cause the computer device to instantiate the thick file prior to performing any write operations to the thick file.

14. The non-transitory computer-readable storage medium of claim 12, further comprising computer executable instructions, which when executed by a computer device, further cause the computer device to extend a thin file with allocation units only during a write operation and only when one or more allocation units are required to store data associated with the write operation.

15. The non-transitory computer-readable storage medium of claim 12, further comprising computer executable instructions, which when executed by a computer device, further cause the computer device to define additional file blocks of the second type from one or more file blocks of the first type when there are insufficient file blocks of the second type for allocation to the thick file.

16. A system comprising:
one or more computer processors; and
a computer-readable storage medium comprising instructions for controlling the one or more computer processors to be operable to:
define a plurality of file blocks of a first type, having a first size, from a plurality of allocation units that comprise the logical volume, the allocation units of the logical volume constituting files in the file system, each file block of the first type comprising a fixed number of allocation units;
define a plurality of file blocks of a second type, having a second size smaller than the first size, within a set of file blocks of the first type, each file block of the second type comprising a fixed number of allocation units less than the number of allocation units that comprise a file block of the first type; and
instantiate a thick file of a specified size with allocation units of the logical volume totaling a size greater than or equal to the specified file size of the thick file, including:
allocating one or more file blocks of the first type to the thick file and allocating one or more file blocks of the second type to the thick file when the specified file size of the thick file is greater than or equal to a size of a file block of the first type so that a total size of file blocks of the first type and the second type allocated to the thick file is greater than or equal to the specified file size of the thick file; and
allocating only file blocks of the second type to the thick file when the specified file size of the thick file is less than the size of a file block of the first type.

17. The system of claim 16, wherein the computer-readable storage medium further comprises instructions for controlling the one or more computer processors to be operable to instantiate the thick file prior to performing any write operations to the thick file.

18. The system of claim 16, wherein the computer-readable storage medium further comprises instructions for controlling the one or more computer processors to be operable to:
   extend a thin file with allocation units only during a write operation and only when one or more allocation units are required to store data associated with the write operation; and
   define additional file blocks of the second type from one or more file blocks of the first type when there are insufficient file blocks of the second type for allocation to the thin file.

\* \* \* \* \*